Patented Apr. 13, 1948

2,439,380

UNITED STATES PATENT OFFICE 2,439,380

PRINTING INKS

Everett F. Carman, Montclair, and Otto P. Berberich, Jersey City, N. J., assignors to Interchemical Corporation, New York, N. Y., a corporation of Ohio No Drawing. Application April 10, 1945, Serial No. 587,620

4 Claims. (Cl. 106—30)

This invention relates to printing inks useful in the printing of newspapers and similar porous stocks, and is directed at the production of new inks of this type characterized by adequate press stability for newspaper ink, combined with marked rubproofness and much improved appearance.

Printing of newspapers, telephone books and magazines on porous stock differs from other printing operations in that very high press speeds are required, the stock is very absorbent and the ultimate cost of the finished product is of paramount importance. The usual cheap inks for this purpose are made by dispersing pigment in very high boiling (and hence press-stable) petroleum fractions which are known to the trade as ink-oils. Such inks are non-drying in the ordinary sense (i. e. non-film-forming), but dry by penetration of the oil into the porous stock to a point where the printed product may be handled. However, this penetration occurs for a long time after printing and consequently the attainment of real drying is very slow. Moreover, if downward penetration is too great, the print becomes visible from the opposite side of the paper and creates the condition known as "strike-through" which necessitates the use of rather heavy news stock with the inks now commercially available; or if outward penetration or spreading of the ink is too great, it causes a lack of clarity in the outlines of the printed matter. Another objection to the standard news inks is their lack of a tenacious binder so that when relatively large proportions of pigment are used, there is a decided tendency for the color to smudge.

The "strike-through" produces poor appearance in itself, which is increased by the smudging; moreover, the smudging on handling produces an undesirable transfer of ink to the person of the handler.

Attempts have been made to overcome this difficulty by the addition of resins such as rosin or gilsonite to the ink, to bind the pigment. However, if sufficient resin is added to produce a rub-proof print, the ink is too viscous for newsprinting. If the viscosity is reduced by adding thinning solvents, the resultant ink will not have the desirable press-stability. (Press-stability in a newspaper plant means that an inked form must turn over after the press has been idle for almost a week, on the Sunday editions—it is economically unsound to wash the presses, and hence they must be utilizable with the ink on the press.)

We have discovered that a news ink can be made which shows markedly reduced strike-through, is smudge-resistant and still has the desired property of drying so slowly on a press that it can be turned over after almost a week's idleness without cleaning up. Our new inks consist of pigments dispersed in vehicles containing essentially from 20 to 40% of limed rosin, containing 6 to 8% of calcium, calculated as $Ca(OH)_2$, from 1 to 2 times as much news ink oil, and sufficient additional solvent of the kerosene type—from 20 to 50% of the vehicle—to reduce the viscosity to that required for newsprinting.

The news ink oil used is the typical ink oil of the trade—a non-drying petroleum oil with a rather high viscosity (ca. 0.25 poises to 10.0 poises at 30° C.), which yields an ink of from about 1 to 20 poise viscosity at 30° C. when sufficient pigment is incorporated. The solution of any substantial quantity of a resin in such an ink oil produces a product of considerably higher viscosity than is desirable.

Merely dissolving a resin in the ink oil will not produce a smudge-resistant film. Limed rosin of 6-8% hydrated lime content seems to be almost unique, in its effect on these petroleum oils in producing smudge-resistance; the only other resin we have found which has similar properties is a resin obtainable from Utah coal, and described and claimed in co-pending application Serial No. 587,621, filed April 10, 1945 (Patent No. 2,439,378).

It is essential that the ratio of ink oil to limed rosin should not be in excess of 2 to 1; if this ratio is exceeded, the ink will not show the marked resistance to smudging which is a principal feature of the inks of our invention. However, if the ratio of ink oil to resin falls below 1 to 1, the ink fails to show the necessary press-stability.

Obviously, the inclusion of ½ to 1 part by weight of resin to a part of oil produces a product of far greater viscosity than that of the oil itself. Hence, it is necessary to reduce the viscosity of the mixture. We do this with a petroleum solvent having viscosity characteristics not essentially different from kerosene, and which is no more volatile than kerosene. Ordinary kerosene may be used, but we prefer low-viscosity low-solvency solvents of the type described in the Gessler et al. Patent No. 2,285,430, which are somewhat less volatile than kerosene, have only slightly higher viscosities, and have considerably lower solvency.

None of these low viscosity solvents are press-stable for more than possibly overnight, and hence largely evaporate from the ink or the press long before a week's shutdown is over. However, if at least about as much ink oil is present as resin, the press will still turn over, the ink containing sufficient residual solvent plus ink oil to keep it wet enough for the purpose.

In order to get the necessary viscosity, the kerosene must be kept between a minimum of 20% and a maximum of 50% of the vehicle.

The limed rosin may be made by dry liming of rosin in conventional fashion, by melting the rosin and allowing it to react with the lime. Since difficulties are sometimes encountered in dry liming up to a lime content of 6–8%, we prefer to heat a solution of the rosin in the desired solvent or solvents. Such a resin may be made as follows:

Example 1.—Limed rosin varnish

| | Parts by weight |
|---|---|
| Gum rosin | 35.40 |
| News ink oil (non-volatile petroleum oil—viscosity 0.4 poise at 30° C.) | 42.50 | are heated together at 175° C. until clear.

2.84 parts by weight hydrated lime are added, and the mixture is heated at 210° C. until reaction is complete. The viscous liquid is then thinned with 19.26 parts of a low solvency kerosene (boiling range 410–546° F.—aniline number 172—dimethyl sulfate value 2.2).

This yields a varnish with a viscosity of 11 poises at 30° C.

Example 2.—Black ink

A black ink can be made from the varnish by grinding—

| | Parts by weight |
|---|---|
| Carbon black | 12.3 |
| Varnish of Example 1 | 68.4 |
| Low solvency kerosene of Example 1 | 19.3 |
| | 100.0 |

A three roll mill, a colloid mill, or other known dispersing mill is used; the product is preferably centrifuged to get a gritless ink.

The vehicle contains about 30% of resin, about 33% ink oil, and about 37% of kerosene. The ink has a viscosity of about 4 poises at 30° C.; it prints well, has the necessary press stability to permit printing after a six day layover without washup of the press, and gives prints which are not only definitely rub-resistant, but which are considerably sharper than conventional news ink prints, particularly in the halftones.

Example 3.—Toned ink

A blacker news ink can be made by using the following ingredients:

| | Parts by weight |
|---|---|
| Carbon black | 11.25 |
| Methyl violet toner | 2.00 |
| Induline toner | 2.00 |
| Varnish of Example 1 | 67.75 |
| Low solvency kerosene (aniline number 176—boiling range 420–530° F.) | 17.00 |

This ink is made as in Example 2. It has a viscosity of about 4 poises at 30° C., and is noticeably blacker than the ink of Example 2. The vehicle contains about 31% resin, about 34% ink oil, and about 35% kerosene.

Example 4.—Comic ink

As typical of the colored inks which are used for Sunday comic supplements, we prepare a red ink from—

| | Parts by weight |
|---|---|
| Barium lithol red | 10.5 |
| Sodium lithol red | 4.0 |
| Magnesia | 2.0 |
| Varnish of Example 1 | 73.0 |
| Kerosene of Example 3 | 10.5 |

This ink has a viscosity of about 12 poises at 30° C.; it is heavier in viscosity than the black inks because of the different printing requirements—like the blacks, it gives improved printing, and the printed paper is much more resistant to smudging than conventional inks.

The vehicle contains about 34% resin, about 37% ink oil and about 29% kerosene.

It will be noted that in these preferred examples, the vehicles in every case contain the ingredients in approximately equal proportions—i. e. none of the three essential ingredients varies by more than 5% from comprising one third of the total.

The examples can of course be multiplied indefinitely without departing from the scope of the invention, which is defined in the claims. In particular, the ratio of ink oil to resin can be raised up to the indicated limit of about 2 to 1, with a slight increase in press life; but the 2 to 1 ratio should not be exceeded, or smudge-resistance is lost. Similarly, the amounts of limed rosin and kerosene may be varied as indicated, depending on the amount of ink oil, and the viscosity desired in the news ink range of from about 1 to 20 poises at 30° C.

Furthermore, the specific ink oil and kerosenes shown may be substituted by other known ink oils, and by substantially any petroleum distillate in the kerosene range.

Small percentages of additives such as grease, wax, etc., may be incorporated into the vehicle; but essentially it should not be substantially varied from the indicated composition.

We claim:

1. A press-stable news ink having improved smudge-resistance and showing reduced strike-through, comprising pigment dispersed in a vehicle consisting essentially of 20% to 40% of limed rosin containing 6% to 8% of calcium calculated as calcium hyroxide, a news ink oil from 1 to 2 times the weight of the rosin, and from 20 to 50% of kerosene, the proportions of the ingredients being such as to yield an ink with a viscosity of from about 1 to 20 poises at 30° C.

2. A press-stable news ink having improved smudge-resistance and showing reduced strike-through, comprising pigment dispersed in a vehicle consisting essentially of 20% to 40% of limed rosin containing 6% to 8% of calcium calculated as calcium hydroxide, a news ink oil from 1 to 2 times the weight of the rosin, and from 20 to 50% of low solvency kerosene, the proportions of the ingredients being such as to yield an ink with a viscosity of from about 1 to 20 poises at 30° C.

3. A press-stable news ink having improved smudge-resistance and showing reduced strike-through, comprising pigment dispersed in a vehicle consisting essentially of approximately equal proportions by weight of limed rosin containing 6 to 8% of calcium calculated as calcium hydroxide, news ink oil, and kerosene.

4. A press-stable news ink having improved smudge-resistance and showing reduced strike-through, comprising pigment dispersed in a vehicle consisting essentially of approximately equal proportions by weight of limed rosin containing 6 to 8% of calcium calculated as calcium hydroxide, news ink oil, and low-solvency kerosene.

EVERETT F. CARMAN.
OTTO P. BERBERICH.

REFERENCES CITED

The following references are of record in the file of this patent:

UNITED STATES PATENTS

| Number | Name | Date |
|---|---|---|
| 2,357,927 | Berg | Sept. 12, 1944 |
| 2,301,854 | Carman | Nov. 10, 1942 |

FOREIGN PATENTS

| Number | Country | Date |
|---|---|---|
| 423,751 | Great Britain | Feb. 7, 1935 |